United States Patent
Yoo et al.

(10) Patent No.: US 9,867,071 B2
(45) Date of Patent: Jan. 9, 2018

(54) APPARATUS AND METHOD FOR AVOIDING COLLISIONS BETWEEN WIRELESS COMMUNICATION SYSTEMS

(71) Applicant: Electronics and Telecommunications Research Institute, Daejeon (KR)

(72) Inventors: Sung Jin Yoo, Daejeon (KR); Jung Sun Um, Daejeon (KR); Byung Jang Jeong, Daejeon (KR); Sung Hyun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 14/750,556

(22) Filed: Jun. 25, 2015

(65) Prior Publication Data

US 2015/0382234 A1 Dec. 31, 2015

(30) Foreign Application Priority Data

Jun. 30, 2014 (KR) .................. 10-2014-0080943

(51) Int. Cl.
*H04W 4/00* (2009.01)
*H04W 24/08* (2009.01)
*H04L 1/00* (2006.01)
*H04W 72/04* (2009.01)

(52) U.S. Cl.
CPC .............. *H04W 24/08* (2013.01); *H04L 1/00* (2013.01); *H04W 72/0453* (2013.01)

(58) Field of Classification Search
CPC .... H04L 5/0087; H04L 5/0091; H04W 72/04; H04W 28/044; H04W 24/08; H04W 72/0446

USPC .................................................. 370/329, 328
See application file for complete search history.

(56) References Cited

U.S. PATENT DOCUMENTS

| | | | |
|---|---|---|---|
| 7,899,396 B2 | 3/2011 | Meylan et al. | |
| 7,986,966 B2 * | 7/2011 | Sekiya | G01S 7/021 342/159 |
| 2010/0046402 A1 * | 2/2010 | Forck | H04L 1/0029 370/280 |
| 2010/0124215 A1 * | 5/2010 | Kogawa | H04W 16/14 370/347 |
| 2011/0128883 A1 * | 6/2011 | Chung | H04B 7/155 370/252 |
| 2011/0200028 A1 * | 8/2011 | Suzuki | H04L 1/1861 370/338 |
| 2013/0163575 A1 | 6/2013 | Etri | |
| 2013/0165170 A1 | 6/2013 | Kang | |
| 2013/0201930 A1 * | 8/2013 | Okino | H04W 72/1289 370/329 |

(Continued)

FOREIGN PATENT DOCUMENTS

KR 1020070083321 A 8/2007

*Primary Examiner* — Chi H Pham
*Assistant Examiner* — Alexander O Boakye
(74) *Attorney, Agent, or Firm* — William Park & Associates Ltd.

(57) ABSTRACT

A wireless communication method may include performing, by a first system, channel monitoring of a first band, detecting a second system that uses the first band, determining whether the first system is to be used in preference to the second system, and allocating a radio resource of the first band to the first system based on whether the first system is to be used in preference to the second system.

16 Claims, 16 Drawing Sheets

(56) References Cited

U.S. PATENT DOCUMENTS

2014/0126504 A1 5/2014 Jung et al.

* cited by examiner

FIG. 7

| | Repetition period = 3 | | |
|---|---|---|---|
| 710 — Repetition pattern of first terminal | 1 | 0 | 1 |
| 720 — Repetition pattern of second terminal | 0 | 1 | 0 |

APPARATUS AND METHOD FOR AVOIDING COLLISIONS BETWEEN WIRELESS COMMUNICATION SYSTEMS

CROSS-REFERENCE TO RELATED APPLICATION

This application claims the benefit of Korean Patent Application No. 10-2014-0080943, filed on Jun. 30, 2014, in the Korean Intellectual Property Office, the disclosure of which is incorporated herein by reference.

BACKGROUND

1. Field of the Invention

The present invention relates to a wireless communication system and more particularly, to a method of sharing a frequency between the same or different wireless communication systems.

2. Description of the Related Art

Unlike licensed bands, in unlicensed bands, systems employing different communication schemes may share and use the same frequency. For example, industrial, scientific and medical (ISM) bands are being mainly shared and used by a wireless local area network (WLAN) system and a Bluetooth system. To avoid a frequency collision with a WLAN, a scheme of generating and using only good frequencies as a hopping sequence during a frequency hopping is being used in a Bluetooth wireless communication scheme. The above scheme may be advantageous to both the Bluetooth and a wireless fidelity (WiFi) in terms of a transmission rate.

However, the above scheme may be possible due to specificity of a Bluetooth modulation scheme of performing a frequency hopping in a relatively wide band of 79 megahertz (MHz). The above adaptive frequency hopping scheme may not be available in all communication schemes. In a 3rd Generation Partnership Project (3GPP) system, for example, a long-term evolution (LTE), a single serving cell has 20 MHz, which is similar to a size of a band used in the WLAN. Accordingly, it may be difficult to perform a communication in bands other than the band used in the WLAN, when the same central frequency is used by the 3GPP system and the WLAN.

Therefore, there is a desire for a coexistence method to enable a communication system operating in a bandwidth similar to that of a WLAN system to coexist with the WLAN system in an unlicensed band, in a different manner from a case of a Bluetooth system.

SUMMARY

According to an aspect of the present invention, there is provided a wireless communication method including performing, by a first system, channel monitoring of a first band, detecting a second system that uses the first band, determining whether the first system is to be used in preference to the second system, and allocating a radio resource of the first band to the first system based on whether the first system is to be used in preference to the second system.

The allocating may include, when it is determined that the first system is to be used in preference to the second system, allocating a time resource to the first system after a first waiting interval. The first waiting interval may exceed a short interframe space (SIFS) and may be shorter than a distributed interframe space (DIFS).

The allocating may include, when a state in which the second system does not perform a communication in the first band is detected, allocating the time resource to the first system.

The allocating may include, when it is determined that the first system is not to be used in preference to the second system, allocating a time resource to the first system after a second waiting interval. The second waiting interval may exceed a sum of a DIFS and a predetermined backoff interval.

The allocating may include, when a state in which the second system does not perform a communication in the first band is detected, allocating the time resource to the first system.

The wireless communication method may further include waiting for a data transmission during a preset period of time when a state in which the second system performs a communication in the first band after the second waiting interval is detected.

The allocating may include allocating the time resource to the first system from a random point in time after the first waiting interval.

The allocating may include allocating the time resource to the first system after the first waiting interval by adjusting a length of a cyclic prefix of a data frame used in the first system.

The wireless communication method may further include transmitting allocation information of the radio resource to at least one terminal in the first system.

The transmitting may include transmitting at least one of time information and frequency information associated with allocation of the radio resource or at least one of a use period and a use pattern of the at least one terminal.

The wireless communication method may further include, when it is determined that the first system is to be used in preference to the second system, transmitting a dummy signal using a radio resource that is not used in the first system.

The dummy signal may include a signal having an orthogonality with respect to a signal having a first signal pattern or a signal used in the first system.

According to another aspect of the present invention, there is provided a wireless communication method including performing, by a first system, channel monitoring of a first band, determining an operating mode of the first system based on a result of the channel monitoring, allocating a radio resource of the first system to the first band based on the determined operating mode, and performing, by the first system, a communication using the allocated radio resource.

The channel monitoring may include determining whether a second system different from the first system performs a communication using the first band.

The operating mode may be determined as an exclusive mode or a coexistence mode. When the second system is not detected, the first system may be determined to operate in the exclusive mode. When the second system is detected, the first system may be determined to operate in the coexistence mode.

When the first system is determined to operate in the coexistence mode, the radio resource may be allocated to the first band after a DIFS and a predetermined backoff interval elapse.

According to another aspect of the present invention, there is provided a wireless communication method including allocating a radio resource of a first system in a first band based on a frequency and a time of a signal of the first system, and transmitting data of the first system by including a dummy signal in an interval in which the radio resource is not allocated in the first band.

The first system may include a first terminal and a second terminal. The transmitting may include transmitting the data of the first system by including a signal of the second terminal and the dummy signal in an interval in which the radio resource is not allocated to the first terminal.

The dummy signal and the signal of the second system have an orthogonality with respect to each other.

According to another aspect of the present invention, there is provided a wireless communication method including sensing, by a second system, a signal including a dummy signal of a first system through carrier sensing, the second system performing a communication using a first band, and allocating a radio resource of the second system based on the dummy signal to prevent a collision with a signal of the first system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a diagram illustrating an example of radio resources that have a repetition period and that are allocated to terminals in a wireless communication system according to an embodiment;

DETAILED DESCRIPTION

Figure 1:
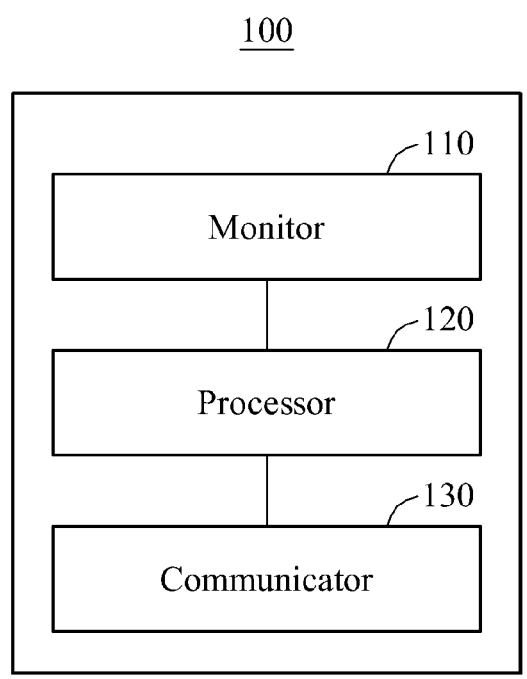
FIG. 1 is a block diagram illustrating an example of a configuration of a wireless communication system according to an embodiment.

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

The terms used herein are mainly selected from general terms currently being used in light of functions in the present disclosure. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating a configuration of a wireless communication system 100 according to an embodiment.

The wireless communication system 100 may perform a communication using a frequency band. When the wireless communication system 100 uses the same frequency band as a frequency band used by another system to perform the communication, signals may collide. To avoid a signal collision between the wireless communication system 100 and another wireless communication system that uses the same central frequency as that of the wireless communication system 100, the wireless communication system 100 may allocate radio resources of a frequency band to be used so that the radio resources may not overlap with radio resources used by the other wireless communication system.

The wireless communication system 100 may include a monitor 110, a processor 120 and a communicator 130. In the following description, the wireless communication system 100 may be referred to as a "first system." The monitor 110 of the first system may perform channel monitoring of a first band. In the present disclosure, the first band may refer to a frequency band used by the first system to perform a communication. Systems other than the first system, for example, a second system, as well as the first system may use the first band to perform a communication.

The first band may be, for example, an unlicensed band. The same or different wireless communication systems may perform a communication using an unlicensed band. In the unlicensed band, a communication system employing a wireless local area network (WLAN) scheme may be activated. To use the unlicensed band, the first system may need to solve a problem of coexistence with the communication system employing the WLAN scheme. Accordingly, a degradation in performance due to a frequency collision with a WLAN may be prevented. The first system may allocate a radio resource of the unlicensed band based on a current situation in which the WLAN is used in the unlicensed band.

The monitor 110 may detect a second system that uses the first band. When the second system is detected, the processor 120 in the first system may determine whether the first system is to be used in preference to the second system. The processor 120 may allocate a radio resource of the first band to the first system based on whether the first system is to be used in preference to the second system.

The communicator 130 may transmit a signal of the first system using the allocated radio resource.

Hereinafter, various applications or operations performed by a wireless communication system referred to as a first system will be described. Even though a configuration of one of a monitor, a processor and a communicator is not specified, description that is clearly understandable or predictable by one of ordinary skill in the art to which this invention belongs will be understood by a typical implementation. The scope of the right of the present invention is not limited by a physical and/or logical structure or a name of a specific configuration.

Figure 2:
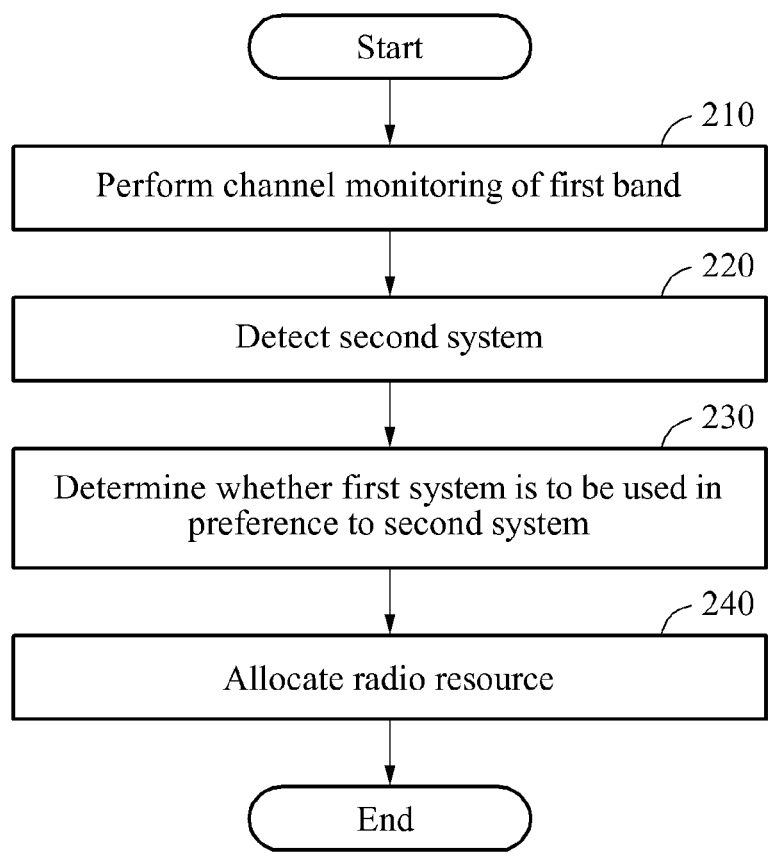
FIG. 2 is a flowchart illustrating an example of a wireless communication method according to an embodiment.

FIG. 2 is a flowchart illustrating an example of a wireless communication method according to an embodiment.

Referring to FIG. 2, in operation 210, a monitor in a first system may perform channel monitoring of a first band. The channel monitoring may indicate determining whether a second system different from the first system performs a communication using the first band. For example, the monitor may perform the channel monitoring using a scheme of measuring energy in a first band channel or a scheme of measuring a signal strength, for example, a received signal strength indication (RSSI). One of ordinary skill in the art may easily understand that a type of the channel monitoring is not limited.

In operation 220, the monitor may detect a second system based on the first band. When the second system is not detected, the first system may perform a communication using the first band. When the second system is detected, a radio resource allocation may be required to prevent a collision between a signal of the first system and a signal of the second system.

In operation 230, a processor in the first system may determine whether the first system is to be used in preference to the second system. Using of the first system in preference to the second system may indicate allocating a radio resource of the first band to the first system in preference to the second system so that the first system may perform a communication.

In operation 240, the processor may allocate the radio resource of the first band to the first system based on whether the first system is to be used in preference to the second system. Allocating of the radio resource of the first band based on whether the first system is to be used in preference to the second system will be further described with reference to FIG. 3.

Figure 3:
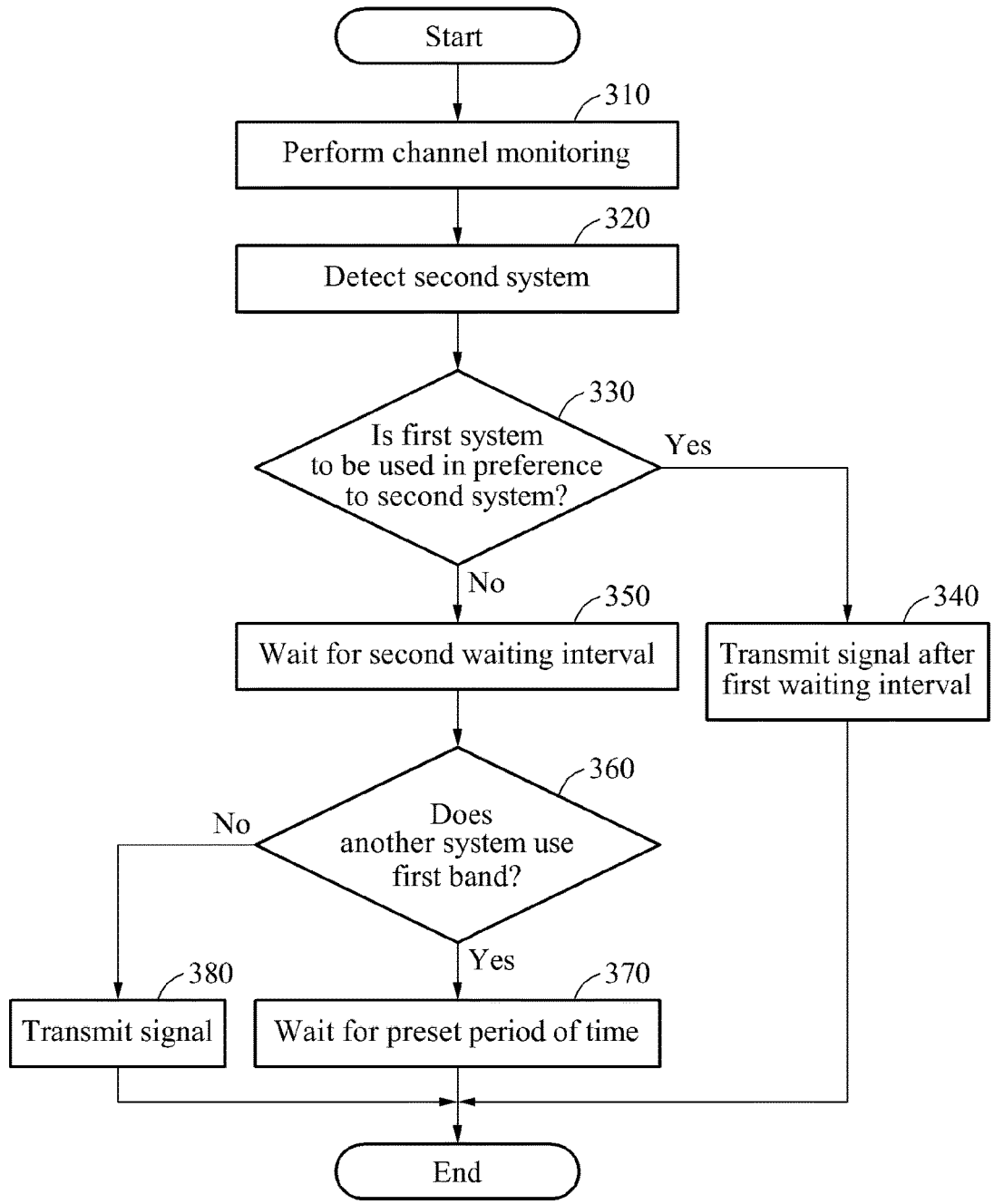
FIG. 3 is a flowchart illustrating another example of a wireless communication method according to an embodiment.

FIG. 3 is a flowchart illustrating another example of a wireless communication method according to an embodiment.

Referring to FIG. 3, in operation 310, a monitor in a first system may perform channel monitoring of a first band.

In operation 320, the monitor may detect a second system that uses the first band.

In operation 330, a processor in the first system may determine whether the first system is to be used in preference to the second system.

When it is determined that the first system is to be used in preference to the second system, a time resource may be allocated to the first system after a first waiting interval in operation 340. In other words, in operation 340, a signal may be transmitted after the first waiting interval. The first waiting interval may exceed a short interframe space (SIFS) and may be shorter than a distributed interframe space (DIFS). The first waiting interval may be represented by the following Equation 1:

$$\text{SIFS} < \text{First waiting interval} < \text{DIFS} \qquad \text{[Equation 1]}$$

The first system may wait for the first waiting interval and may transmit a signal. In other words, the first system may allocate the time resource to the first system after the first waiting interval. When a signal is determined not to be transmitted even though the signal exists in the first system, the signal may not be transmitted even after the first waiting interval. Additionally, the first system may determine not to transmit the signal after the first waiting interval and may yield the radio resource to the second system.

When a state in which the second system does not perform a communication in the first band is detected, the time resource may be allocated to the first system.

The first system may allocate the time resource from a random point in time after the first waiting interval.

When it is determined that the first system is not to be used in preference to the second system, a time resource may be allocated to the first system after a second waiting interval and the first system may wait for the second waiting interval in operation 350. The second waiting interval may exceed a sum of the DIFS and a predetermined backoff interval. The predetermined backoff interval may be, for example, a maximum backoff interval. The second waiting interval may be represented by the following Equation 2:

$$\text{DIFS} + \text{Maximum Backoff interval} < \text{Second waiting interval} \qquad \text{[Equation 2]}$$

The first system may allocate the time resource from a random point in time after the second waiting interval.

In operation 360, whether another system other than the first system uses the first band may be determined.

When the other system uses the first band after waiting for the second waiting interval, the first system may wait for a preset period of time in operation 370. When a system using the first band does not exist after the second waiting interval elapses, the first system may transmit a signal in operation 380.

When a state in which the second system does not perform a communication in the first band is detected, the time resource may be allocated to the first system.

Figure 4:
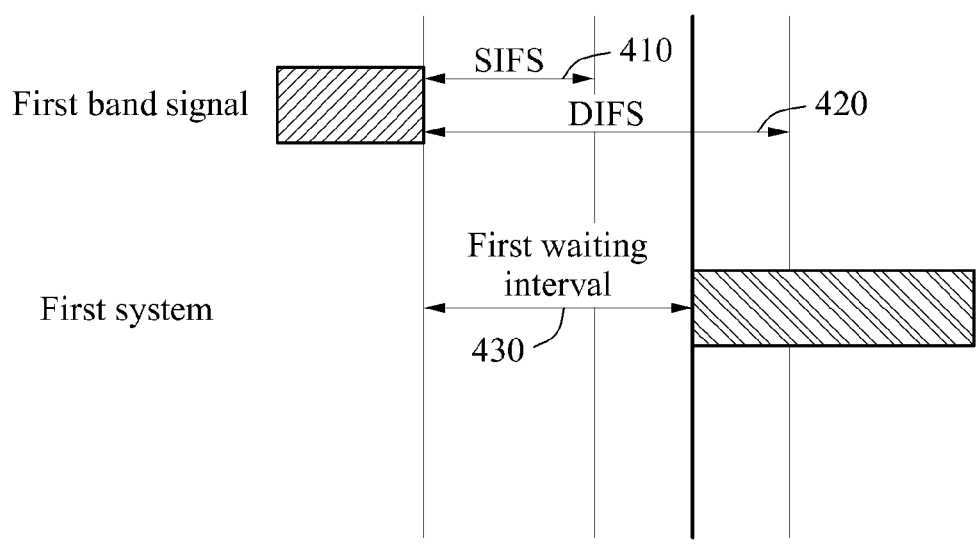
FIG. 4 is a diagram illustrating an example in which a wireless communication system transmits a signal according to an embodiment.

FIG. 4 is a diagram illustrating an example in which a wireless communication system transmits a signal according to an embodiment.

A first system and a second system may perform a communication using a first band. To prevent a collision between a signal of the first system and a signal of the second system, a radio resource of the first band may be allocated.

In an example, the first system may be determined to use the first band in preference to the second system. In this example, when a signal is determined to be transmitted, the first system may wait for a first waiting interval 430 to transmit the signal. The first waiting interval 430 may be represented by Equation 1 described above in FIG. 3. The first waiting interval 430 may exceed an SIFS 410 and may be shorter than a DIFS 420. The second system may not perform a communication in the first band and accordingly, the first system may transmit the signal after the first waiting interval 430.

In another example, the first system and the second system may share radio resources on halves in the first band. In this example, the first system may transmit a signal in a first interval, and the second system may transmit a signal in a second interval. When the first system includes at least two terminals, the first waiting interval 430 may be arbitrarily selected within a range satisfying Equation 1, to prevent a collision between the terminals.

Figure 5:
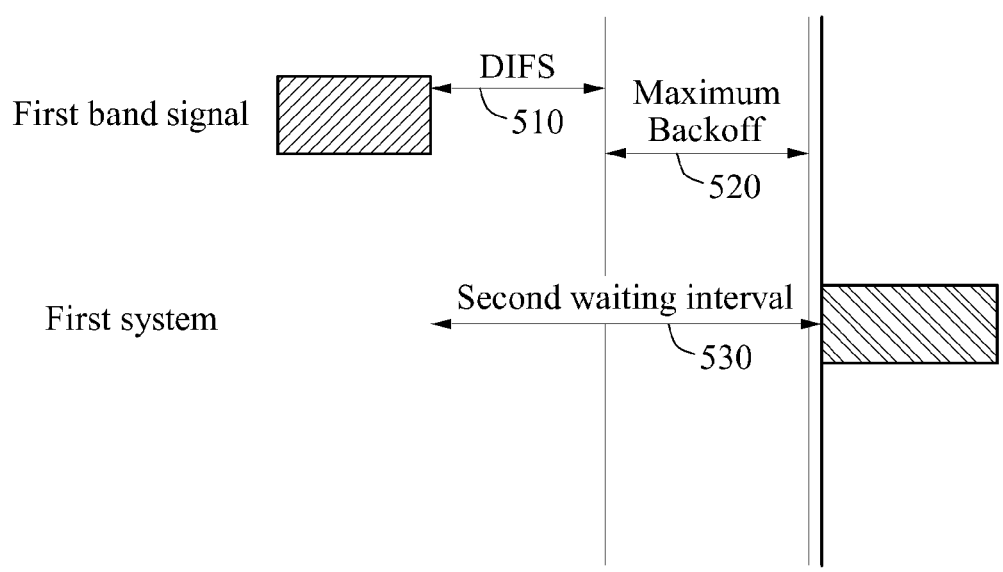
FIG. 5 is a diagram illustrating another example in which a wireless communication system transmits a signal according to an embodiment.

FIG. 5 is a diagram illustrating another example in which a wireless communication system transmits a signal according to an embodiment.

In an example, the first system may be determined not to use a first band in preference to the second system. In other words, when the first system determines to yield the first band to the second system, the first system may transmit a signal after waiting for a second waiting interval 530. The second waiting interval 530 may be represented by Equation 2. The second waiting interval 530 may exceed a sum of a DIFS 510 and a predetermined backoff interval 520. The second system may not perform a communication in the first band and accordingly, the first system may transmit the signal after the second waiting interval 530.

In another example, the first system may operate in the same frequency as that of the second system, and may determine not to use the first band in preference to the second system. In this example, the first system may select an arbitrary point in time after the second waiting interval 530, and may transmit the signal.

Figure 6:
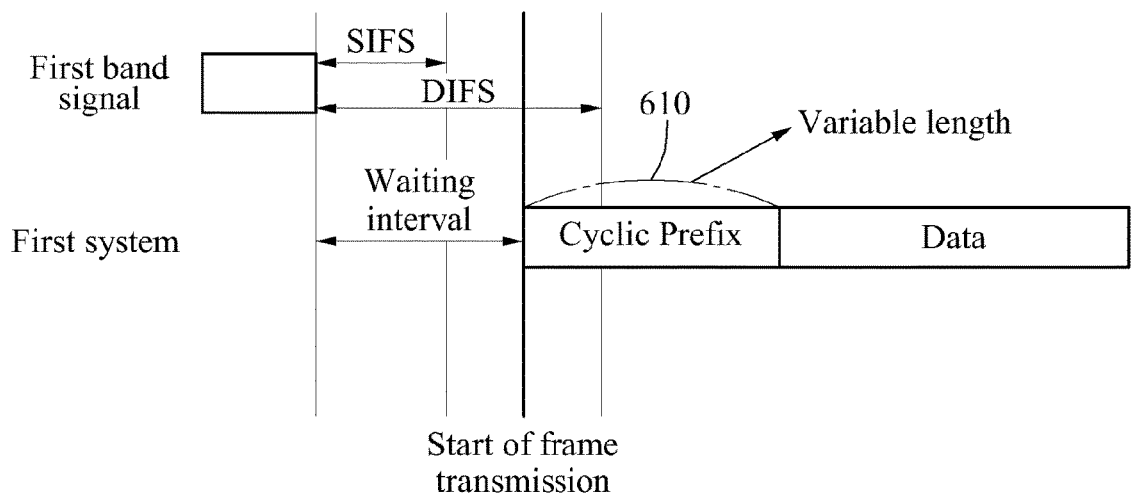
FIG. 6 is a diagram illustrating an example in which a wireless communication system transmits a signal using a cyclic prefix according to an embodiment.

FIG. 6 is a diagram illustrating an example in which a wireless communication system transmits a signal using a cyclic prefix according to an embodiment.

A first system may have a frame structure. When the first system is synchronized with a base station (for example, eNB), the first system may transmit a symbol at a predetermined timing.

The first system may transmit a signal after a first waiting interval or a second waiting interval to share radio resources with a second system in a first band. For example, it may be impossible to transmit a signal at a set timing after the first waiting interval or the second waiting interval in the first system. In this example, a signal transmission timing may be finely adjusted by adjusting a variable length of a cyclic prefix 610 of the signal transmitted in the first system.

When it is difficult to adjust the signal transmission timing, a length of the cyclic prefix 610 may be increased to adjust the signal transmission timing. By adjusting the signal transmission timing based on the cyclic prefix 610, the first system may coexist with the second system in the first band, instead of needing to greatly changing a standard of the first system.

FIG. 7 is a diagram illustrating an example of radio resources that have a repetition period and that are allocated to terminals in a wireless communication system according to an embodiment.

Even though a radio resource is allocated to a first system, the first system may not use the allocated radio resource due to an interference by a second system. A base station may designate and transmit a repetition period and a repetition pattern to at least one terminal in the first system. The at least one terminal may allocate radio resources based on the repetition pattern.

The first system may transmit allocation information of the radio resource to the at least one terminal in the first system. The allocation information of the radio resource may include at least one of time information and frequency information associated with allocation of the radio resource, or at least one of a use period and a use pattern of the at least one terminal.

Referring to FIG. 7, the base station may transmit a repetition pattern with a repetition period of "3" to a first terminal 710. The repetition pattern may be "1", "0", and "1." The base station may transmit a repetition pattern with a repetition period of "3" to a second terminal 720. The repetition pattern may be "0", "1", and "0."

Figure 8:
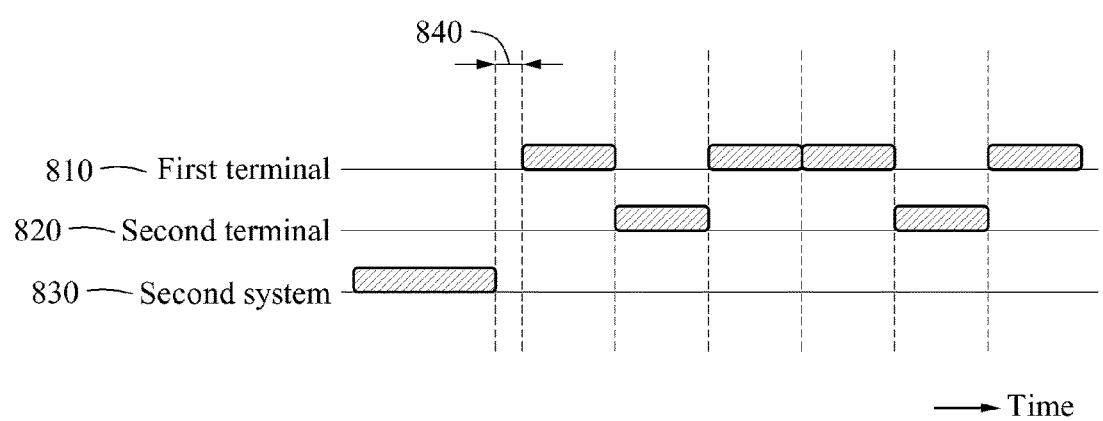
FIG. 8 is a diagram illustrating an example in which terminals use a first band based on the repetition period and repetition patterns of FIG. 7.

FIG. 8 is a diagram illustrating an example in which terminals use a first band based on the repetition period and repetition patterns of FIG. 7.

In FIG. 8, a first system may continue to use a first band, instead of allowing the first band to be used by a second system 830, after the second system 830 uses the first band. A first terminal 810 and a second terminal 820 in the first system may use the first band based on the repetition patterns of FIG. 7. When the first terminal 810 and the second terminal 820 exchange data based on the repetition period and repetition patterns, or when a signal transmission by the second system 830 is impossible, a quality of service (QoS) may be easily guaranteed while maintaining a number of times resources are allocated to each terminal.

Figure 9:
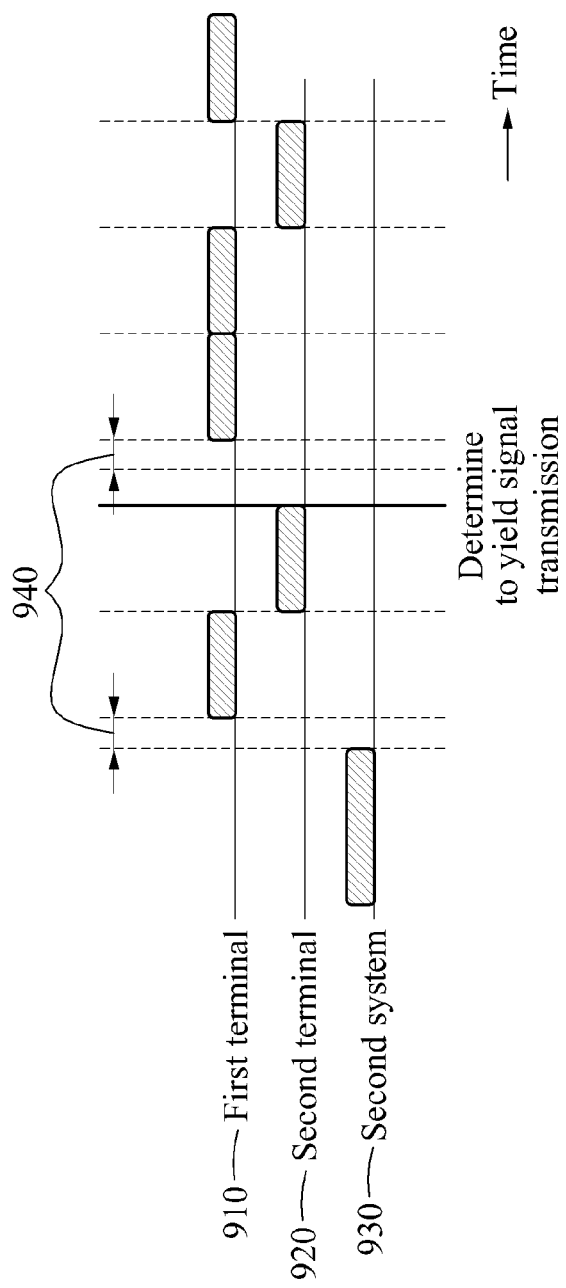
FIG. 9 is a diagram illustrating another example in which terminals use a first band based on the repetition period and repetition patterns of FIG. 7.

FIG. 9 is a diagram illustrating another example in which terminals use a first band based on the repetition period and repetition patterns of FIG. 7.

In FIG. 9, a first terminal 910 and a second terminal 920 in a first system may use a first band based on resources allocated based on the repetition period and repetition patterns of FIG. 7. For example, when the first band is being used by the first system, a second system 930 may also use the first band. In this example, the first terminal 910 and the second terminal 920 may use the first band after a first waiting interval 940. The first waiting interval 940 may exceed an SIFS and may be shorter than a DIFS.

Figure 10:
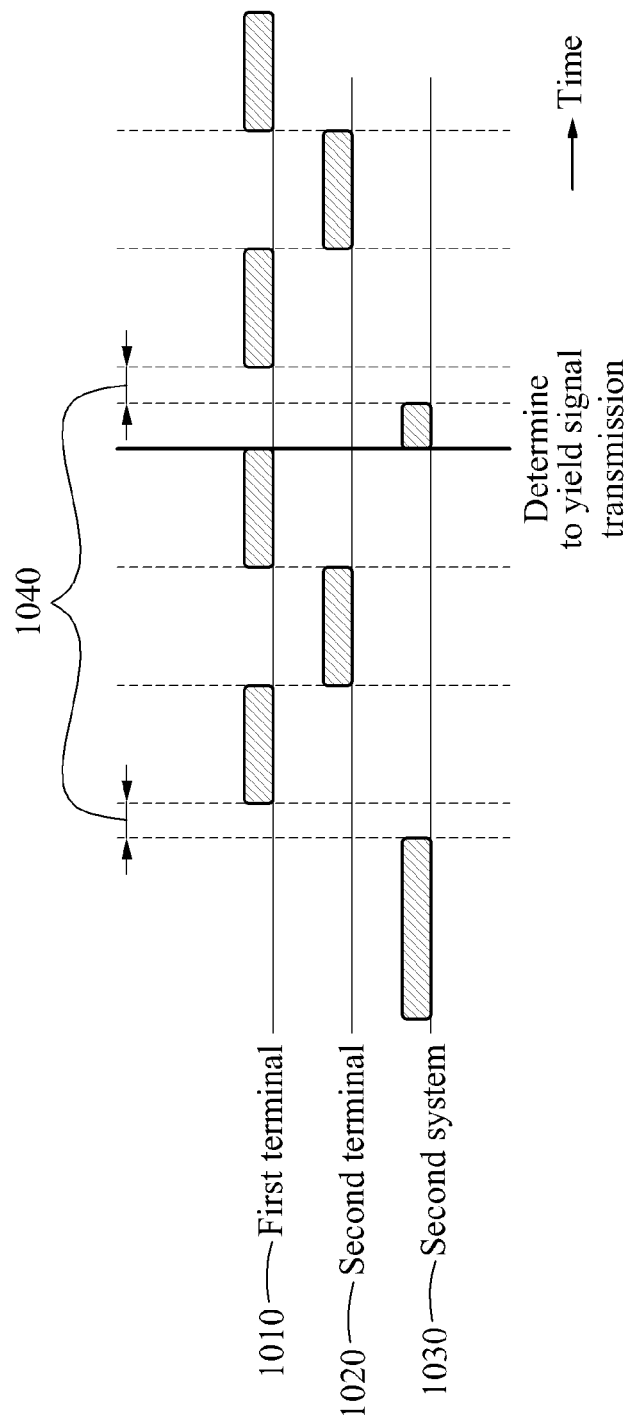
FIG. 10 is a diagram illustrating still another example in which terminals use a first band based on the repetition period and repetition patterns of FIG. 7.

FIG. 10 is a diagram illustrating still another example in which terminals use a first band based on the repetition period and repetition patterns of FIG. 7.

In FIG. 10, a first terminal 1010 and a second terminal 1020 in a first system may use a first band based on resources allocated based on the repetition period and repetition patterns of FIG. 7. When the first band is being used by the first system, a second system 1030 may also use the first band. Time resources of FIG. 10 may be different from time resources of FIG. 9, however, the second system 1030 may use the first band that is already in use. The first terminal 1010 and the second terminal 1020 may use the first band after a first waiting interval 1040.

Figure 11:
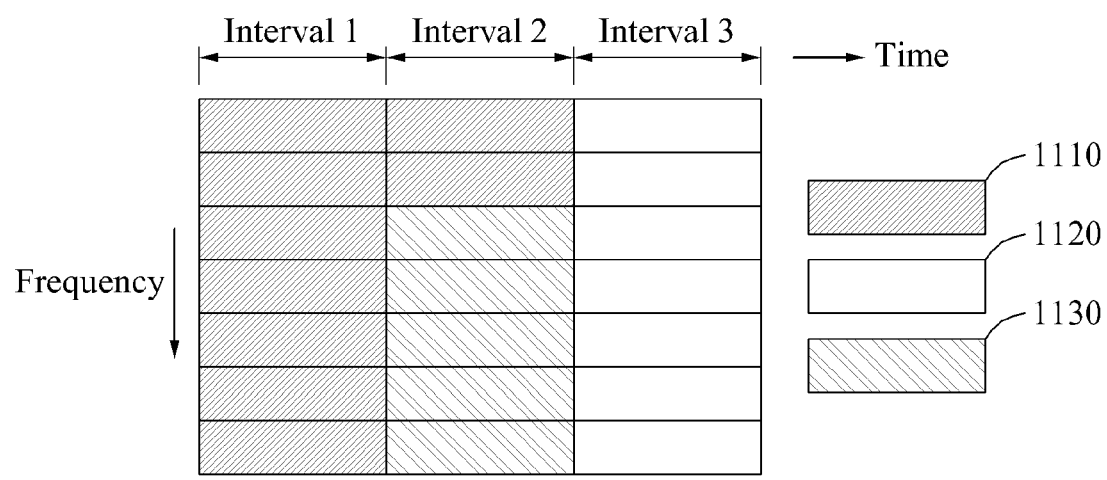
FIG. 11 is a diagram illustrating an example in which a radio resource is allocated to a terminal to avoid a collision of signals between wireless communication systems according to an embodiment.

FIG. 11 is a diagram illustrating an example in which a radio resource is allocated to a terminal to avoid a collision of signals between wireless communication systems according to an embodiment.

For example, a first system may allocate uplink radio resources. In this example, resources (*the uplink radio resources may be allocated in a portion of frequency bands, instead of being allocated in all frequency bands in a specific time slot. Additionally, a signal of the first system may not be sensed based on a carrier sensing performance of a second system and accordingly, the signal of the first system and a signal of the second system may collide with each other.

Referring to FIG. 11, resources may be allocated to all frequency bands in an interval 1, and resources may be allocated to a portion of the frequency bands in an interval 2. In an interval 3, resources may not be allocated to all the frequency bands. In other words, a signal may not exist in the interval 3, as indicated by boxes 1120. Because a signal exists in all the frequency bands in the interval 1 as indicated by boxes 1110, the second system may sense a transmission of the signal of the first system through carrier sensing. Because a signal is transmitted in a portion of the frequency bands in the interval 2 as indicated by the boxes 1110, the carrier sensing of the second system may fail.

As shown in FIG. 11, a dummy signal may be transmitted in frequency bands in which a signal is not transmitted as indicated by boxes 1130 and accordingly, an amount of energy to be transmitted in the interval 2 may increase, which may allow the carrier sensing of the second system to be smoothly performed. In this example, an arbitrary signal may be generated in the frequency bands indicated by boxes 1130, or a signal pattern allowing a synchronization or channel estimation to be smoothly performed may be generated.

When it is determined that the first system is to be used in preference to the second system, the first system may transmit the dummy signal using a radio resource that is not used in the first system.

The dummy signal may be a signal having an orthogonality with respect to a signal having a first signal pattern or a signal used in the first system. Due to the orthogonality, it is possible to prevent radio resources from being wasted due to a transmission of the dummy signal.

Figure 12:
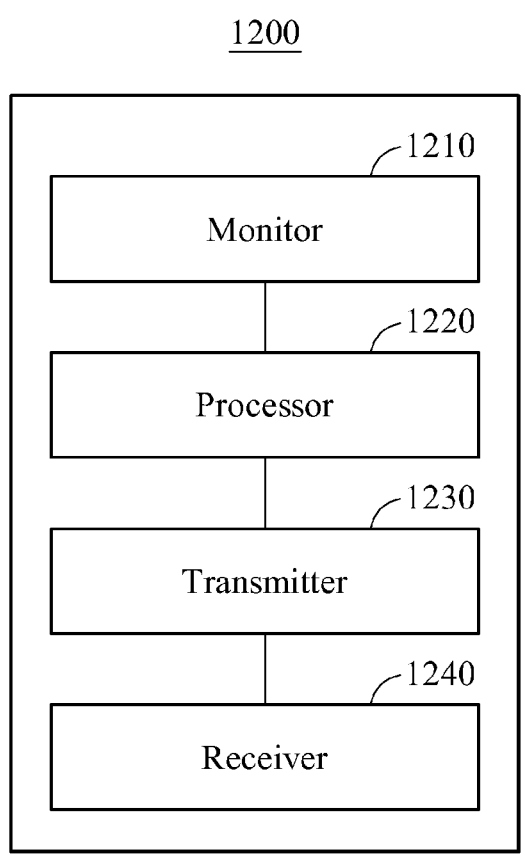
FIG. 12 is a block diagram illustrating another example of a configuration of a wireless communication system according to an embodiment.

FIG. 12 is a block diagram illustrating a configuration of a wireless communication system 1200 according to an embodiment.

The wireless communication system 1200 (hereinafter, also referred to as a first system) may perform a communication using a first band. Systems other than the first system 1200, for example, a second system, as well as the first system 1200 may use the first band to perform a communication.

In an example, the first band may be used by only the first system 1200. In this example, the first system 1200 may use the first band instead of greatly changing an existing standard in a state in which the first system 1200 is not affected by other systems.

In another example, the first band may be used by both the second system and the first system 1200. When the second system uses the first band, an efficiency of a communication performed by the first system 1200 may decrease in comparison to an efficiency of the communication when the first system 1200 exclusively uses the first band. Accordingly, the first system 1200 may operate based on a channel use situation of the first band.

The first system 1200 may include a monitor 1210, a processor 1220, a transmitter 1230 and a receiver 1240. The monitor 1210 may perform channel monitoring of the first band. The channel monitoring may indicate determining whether the second system different from the first system 1200 performs a communication using the first band.

The processor 1220 may determine an operating mode of the first system 1200 based on a result of the channel monitoring. The operating mode may be determined as an exclusive mode or a coexistence mode. When the second system is not detected, the first system 1200 may be determined to operate in the exclusive mode. When the second system is detected, the first system 1200 may be determined to operate in the coexistence mode.

The processor 1220 may allocate a radio resource of the first system 1200 to the first band based on the determined operating mode.

In an example, when the operating mode of the first system 1200 is determined as the exclusive mode, the first system 1200 may allocate the radio resource to the first band, and may perform a communication using the first band.

In another example, when the operating mode is determined as the coexistence mode, the first system 1200 may coexist with the second system based on a DIFS and a predetermined backoff interval.

In still another example, when the operating mode is determined as the coexistence mode, whether the first system 1200 is to be used in preference to the second system may be determined A radio source of the first band may be allocated based on a result of the determining. When it is determined that the first system 1200 is to be used in preference to the second system, the first system 1200 may allocate a time resource to the first system 1200 after a first waiting interval.

The first waiting interval may exceed an SIFS and may be shorter than the DIFS. When it is determined that the first system 1200 is not to be used in preference to the second system, the first system 1200 may allocate a time resource to the first system 1200 after a second waiting interval. The second waiting interval may exceed a sum of the DIFS and the backoff interval.

The transmitter 1230 and the receiver 1240 may perform a communication using the allocated radio resource.

Hereinafter, various applications or operations performed by a wireless communication system referred to as a first system will be described. Even though a configuration of one of a monitor, a processor, a transmitter and a receiver is not specified, description that is clearly understandable or predictable by one of ordinary skill in the art to which this invention belongs will be understood by a typical implementation. The scope of the right of the present invention is not limited by a physical and/or logical structure or a name of a specific configuration.

Figure 13:
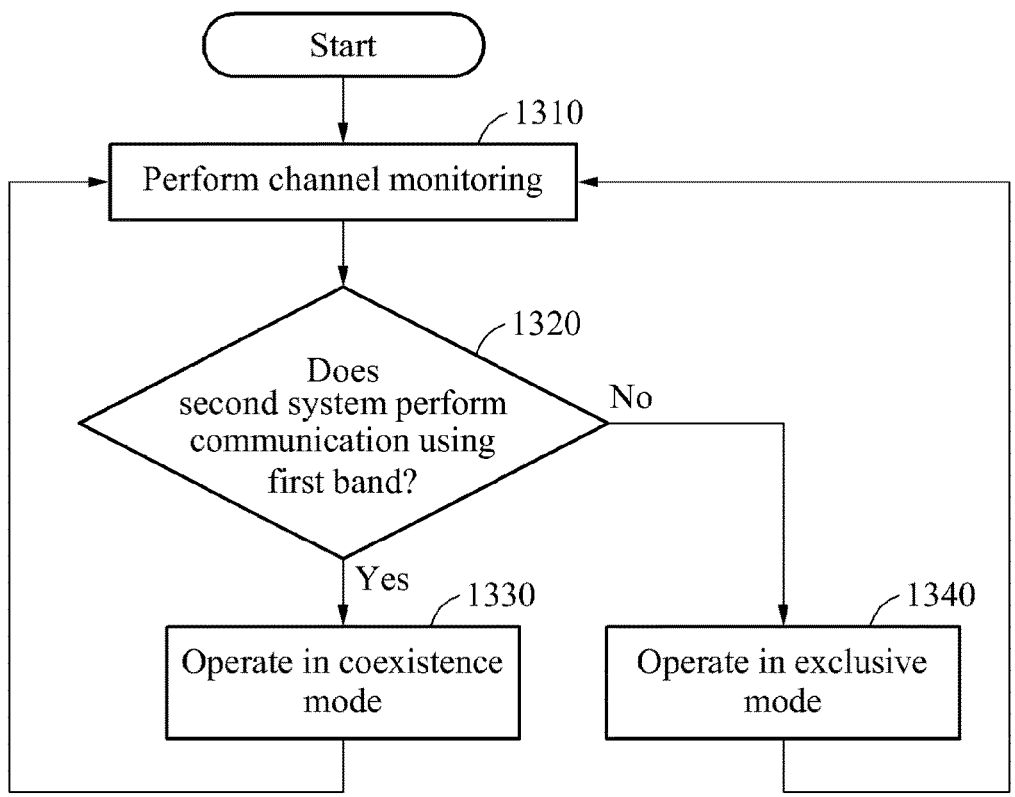
FIG. 13 is a flowchart illustrating an operation of determining an operating mode of a first system in a wireless communication method according to an embodiment.

FIG. 13 is a flowchart illustrating an operation of determining an operating mode of a first system in a wireless communication method according to an embodiment.

Referring to FIG. 13, in operation 1310, a first system may perform channel monitoring of a first band. The channel monitoring may indicate determining whether a second system different from the first system performs a communication using the first band.

In operation 1320, the first system may determine an operating mode of the first system based on a result of the channel monitoring. The operating mode may be determined as an exclusive mode or a coexistence mode. The operating mode may be determined based on whether the second system performs a communication using the first band.

When the second system does not perform the communication using the first band, the first system may be determined to operate in the exclusive mode in operation 1340.

When the second system performs the communication using the first band, the first system may be determined to operate in the coexistence mode in operation 1330.

Figure 14:
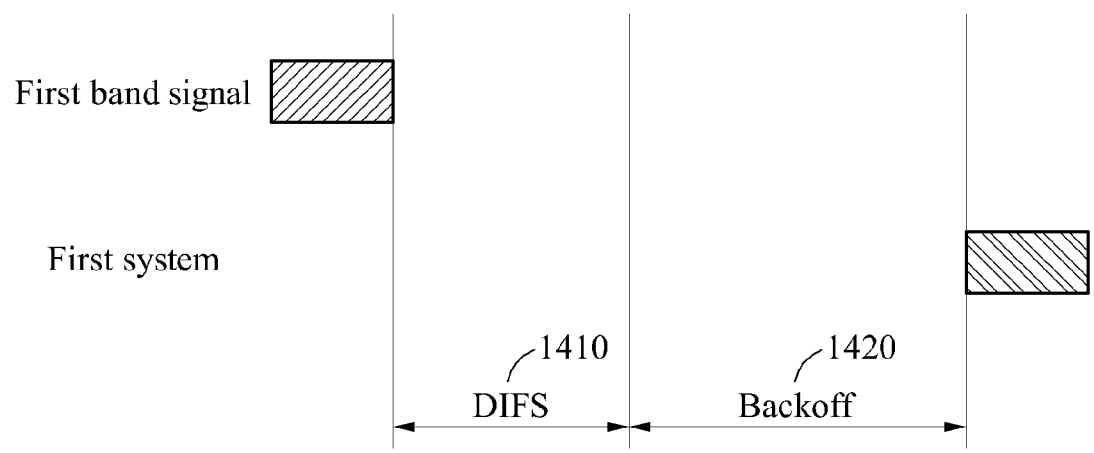
FIG. 14 is a diagram illustrating an example in which a wireless communication system transmits a signal based on a wireless communication method according to an embodiment.

FIG. 14 is a diagram illustrating an example in which a wireless communication system transmits a signal based on a wireless communication method according to an embodiment.

In FIG. 14, a first system may coexist with a second system in a first band. The first system may transmit a signal based on a DIFS 1410 and a predetermined backoff interval 1420. The first system may allocate a radio resource of the first system to the first band after the DIFS 1410 and the backoff interval 1420 elapse.

Figure 15:
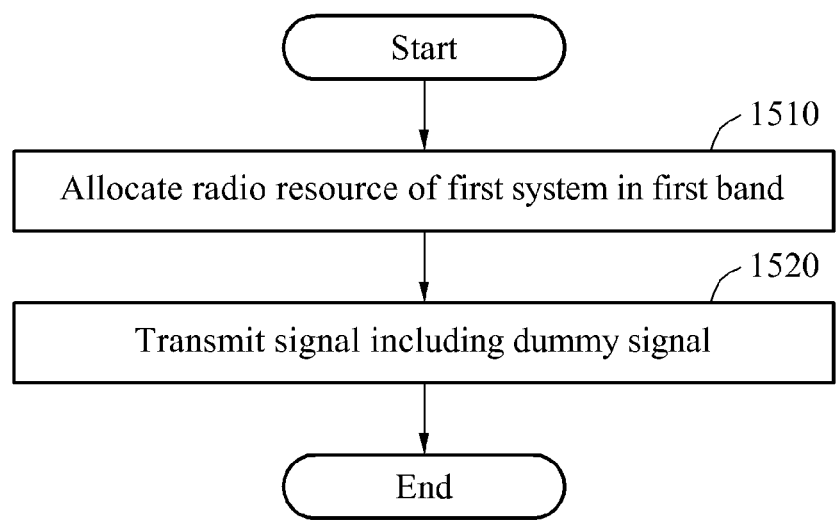
FIG. 15 is a flowchart illustrating an example of a wireless communication method using a dummy signal according to an embodiment.

FIG. 15 is a flowchart illustrating an example of a wireless communication method using a dummy signal according to an embodiment.

To prevent a signal collision with a second system, the first system may use the dummy signal to perform a communication in a first band.

Referring to FIG. 15, in operation 1510, a radio resource of the first system may be allocated to in the first band based on a frequency and a time associated with a signal of the first system. The first system may include a first terminal and a second terminal.

In operation 1520, the first system may transmit data or a signal of the first system by including a dummy signal in an interval in which the radio resource is not allocated in the first band. The first system may transmit the data by including a signal of the second terminal and the dummy signal in an interval in which the radio resource is not allocated to the first terminal. The dummy signal and the signal of the second system may have an orthogonality with respect to each other.

Figure 16:
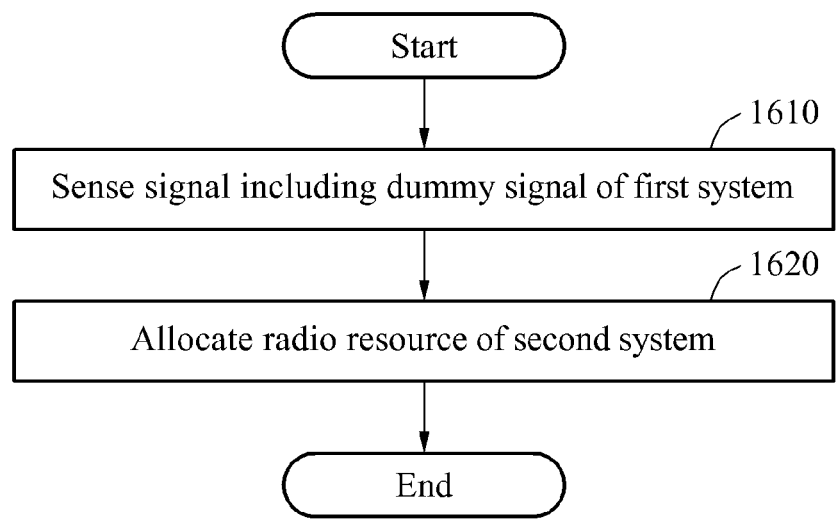
FIG. 16 is a flowchart illustrating another example of a wireless communication method using a dummy signal according to an embodiment.

FIG. 16 is a flowchart illustrating another example of a wireless communication method using a dummy signal according to an embodiment.

To prevent a signal collision with a first system, a second system may sense a dummy signal of the first system and may allocate a radio resource of the second system.

Referring to FIG. 16, in operation 1610, the second system may sense a signal including the dummy signal of the first system through carrier sensing.

In operation 1620, the second system may allocate the radio resource of the second system based on the dummy signal to prevent a collision with a signal of the first system.

The units described herein may be implemented using hardware components, software components, or a combination thereof. The units and components may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wireless communication method comprising:
performing, by a first system, channel monitoring of a first band;
detecting a second system that uses the first band;
determining whether the first system is to be used in preference to the second system; and
allocating a radio resource of the first band to the first system based on whether the first system is to be used in preference to the second system,
wherein the allocating comprises allocating a time resource to the first system after a first waiting interval by adjusting a length of a cyclic prefix of a data frame used in the first system.

2. The wireless communication method of claim 1,
wherein the allocating comprises, when it is determined that the first system is to be used in preference to the second system, allocating the time resource to the first system after the first waiting interval, and
wherein the first waiting interval exceeds a short interframe space (SIFS) and is shorter than a distributed interframe space (DIFS).

3. The wireless communication method of claim 2, wherein the allocating comprises, when a state in which the second system does not perform a communication in the first band is detected, allocating the time resource to the first system.

4. The wireless communication method of claim 2, wherein the allocating comprises allocating the time resource to the first system from a random point in time after the first waiting interval.

5. The wireless communication method of claim 1, wherein the allocating comprises, when it is determined that the first system is not to be used in preference to the second system, allocating the time resource to the first system after a second waiting interval, and
wherein the second waiting interval exceeds a sum of a DIFS and a predetermined backoff interval.

6. The wireless communication method of claim 5, wherein the allocating comprises, when a state in which the second system does not perform a communication in the first band is detected, allocating the time resource to the first system.

7. The wireless communication method of claim 5, further comprising waiting for a data transmission during a preset period of time when a state in which the second system performs a communication in the first band after the second waiting interval is detected.

8. The wireless communication method of claim 1, further comprising transmitting allocation information of the radio resource to at least one terminal in the first system.

9. The wireless communication method of claim 8, wherein the transmitting comprises transmitting at least one of time information and frequency information associated with allocation of the radio resource or at least one of a use period and a use pattern of the at least one terminal.

10. The wireless communication method of claim 1, further comprising, when it is determined that the first system is to be used in preference to the second system, transmitting a dummy signal using a radio resource that is not used in the first system.

11. The wireless communication method of claim 10, wherein the dummy signal comprises a signal having an orthogonality with respect to a signal having a first signal pattern or a signal used in the first system.

12. A wireless communication method comprising:
performing, by a first system, channel monitoring of a first band, wherein the channel monitoring comprises determining whether a second system different from the first system performs a communication using the first band;
determining an operating mode of the first system based on a result of the channel monitoring;
allocating a radio resource of the first system to the first band based on the determined operating mode; and
performing, by the first system, a communication using the allocated radio resource,
wherein the operating mode is determined as an exclusive mode or a coexistence mode,
wherein when the second system is not detected, the first system is determined to operate in the exclusive mode, and
wherein when the second system is detected, the first system is determined to operate in the coexistence mode.

13. The wireless communication method of claim 12, wherein when the first system is determined to operate in the coexistence mode, the radio resource is allocated to the first band after a distributed interframe space (DIFS) and a predetermined backoff interval elapse.

14. A wireless communication method comprising:
allocating a radio resource of a first system in a first band based on a frequency and a time of a signal of the first system;
transmitting data of the first system by including a dummy signal in an interval in which the radio resource is not allocated in the first band, wherein the first system comprises a first terminal and a second terminal, and
wherein the transmitting comprises transmitting the data of the first system by including a signal of the second terminal and the dummy signal in an interval in which the radio resource is not allocated to the first terminal.

15. The wireless communication method of claim 14, wherein the dummy signal and the signal of the second system have an orthogonality with respect to each other.

16. The wireless communication method of claim 14, further comprising:
sensing, by a second system, a signal comprising a dummy signal of a first system through carrier sensing, the second system performing a communication using a first band; and
allocating a radio resource of the second system based on the dummy signal to prevent a collision with a signal of the first system.

* * * * *